Dec. 10, 1968     A. M. SMITH II     3,415,713
NON-WOVEN FABRIC STRUCTURE AND METHOD OF MAKING SAME
Filed April 19, 1965
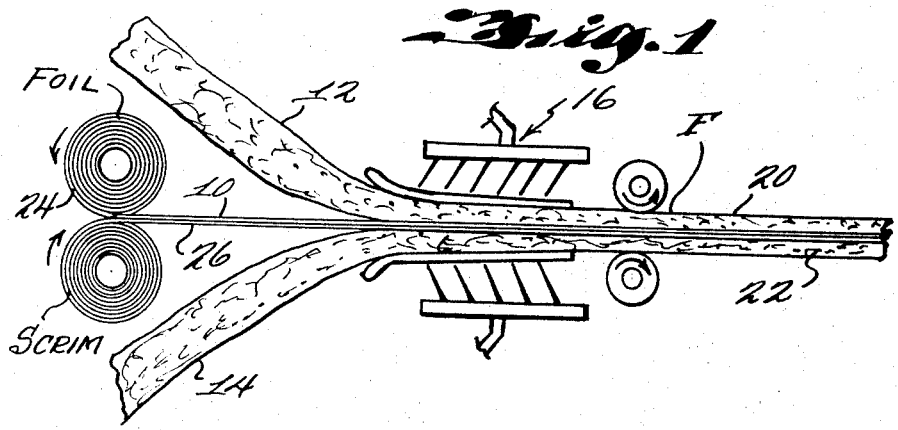
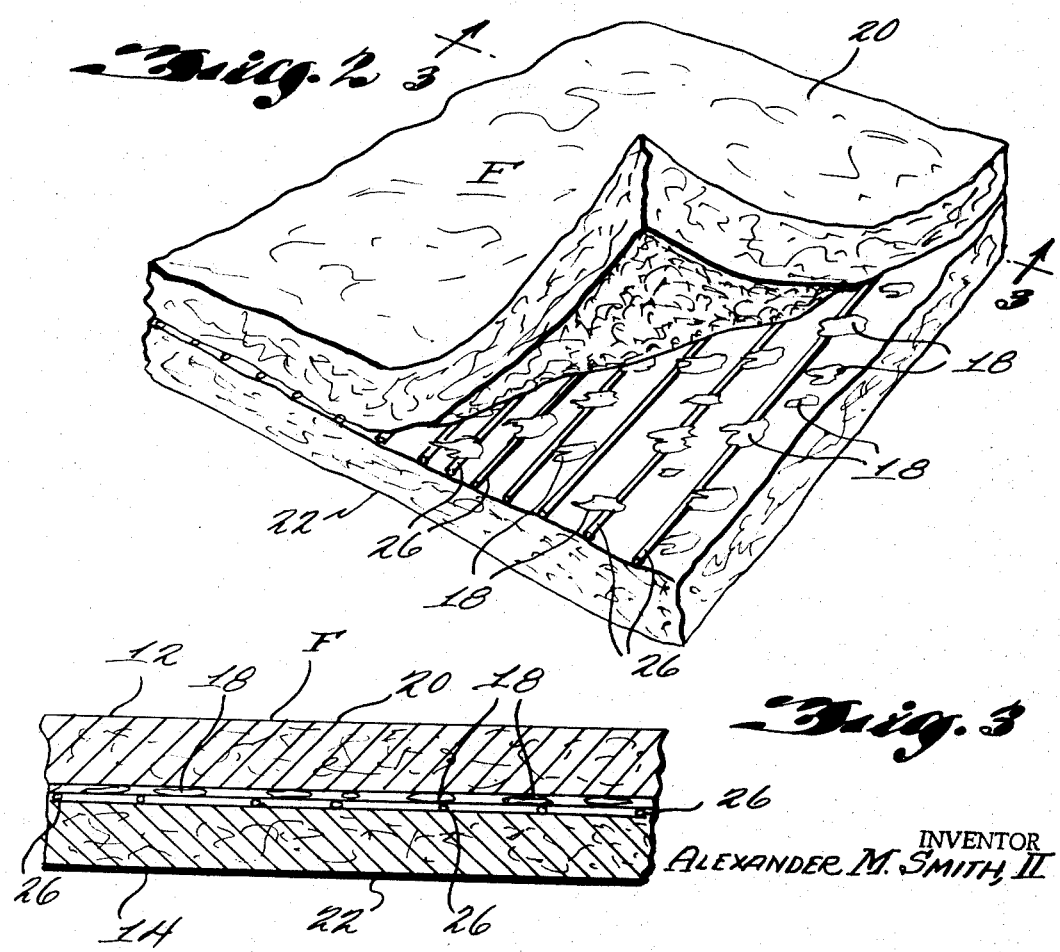
INVENTOR
ALEXANDER M. SMITH, II
BY
ATTORNEYS

United States Patent Office 3,415,713
Patented Dec. 10, 1968

3,415,713
NON-WOVEN FABRIC STRUCTURE AND METHOD OF MAKING SAME
Alexander M. Smith II, Elkin, N.C., assignor to The Fiberwoven Corporation, Elkin, N.C., a corporation of North Carolina
Filed Apr. 19, 1965, Ser. No. 449,068
11 Claims. (Cl. 161—141)

The present invention relates to non-woven fabric structures and, more particularly, to an improved process of making a non-woven fabric structure having a heat reflective layer of chips, particles or platelets of metallic foil sandwiched between the fiber layers and the improved heat reflective fabric structure resulting from the process.

Heretofore efforts have been made to manufacture fabric having heat reflective characteristics. One such prior method involved the spraying of the fabric structure with an aluminum paint. The particles of aluminum were carried in a liquid vehicle and after the fabric structure had been sprayed, the carrier vehicle was removed but a residue of this vehicle, namely, a resin, formed a coating about the aluminum particles reducing the heat reflective effectiveness of the aluminum particles. Additionally, since this process involves spraying the surface with the aluminum paint, the resulting fabric structure was not too porous as the particles filled voids in the same. Since most of the aluminum particles were deposited on or adjacent to the surface of the fabric structure, the feel or "hand" as well as the appearance of the fabric structure was not satisfactory. The utility of the fabric structure as heat reflective fabric structure was not entirely satisfactory because the aluminum particles were subject to surface wear since they were near the surface.

Another process heretofore used to produce a heat reflective fabric structure included passing the fabric structure through a vacuum chamber and evolving an aluminum vapor from an electrically heated trough or cup within the chamber. The surface of the fabric structure was coated with the metal in the chamber. However, this process resulted in a fabric structure having the same disadvantages as mentioned above as a majority of the aluminum particles were deposited on or close to the surface and thus were subject to surface wear as well as affecting the hand and porosity of the finished fabric structure.

A third known process involves the spraying of an adhesive onto a fabric structure and then applying a sheet of aluminum foil to the fabric and subsequently applying a vacuum to the composite structure so as to break up the aluminum foil and draw it down into the fabric. This latter mentioned process and the resulting fabric structure also had the disadvantages mentioned above in that the porosity of the fabric was affected and the aluminum particles were subject to surface wear as the majority of the same were deposited on or near the surface. Additionally, the aluminum particles lost their effectiveness as the adhesive provided a coating on one face of the aluminum particles. The adhesive also made the resultant product stiff.

An object of the present invention is to provide an improved process and product for making a non-woven fabric structure having heat reflective characteristics, the heat reflective material being sandwiched between layers of fibers in one or more planes and spaced from the surfaces of the fabric structure whereby the porosity and hand of the fabric structure are not affected.

Ancillary to the preceding object it is a further object of the present invention to provide a process and an improved product having heat reflective characteristics, the process including the distribution of heat reflective material intermediate layers of fibers whereby the heat reflective material is not subject to surface wear of the fabric structure.

A further object of the present invention is to provide an improved process for making a non-woven fabric structure wherein a heat reflective material is incorporated into the body of the fabric structure when the fabric structure is being formed.

Ancillary to the immediately preceding object it is still another object of the present invention to provide an improved process of making a non-woven fabric structure from webs or batts of loosely matted fibers, the webs or batts being needled into cohering fiber entanglement therebetween simultaneously with the distribution of heat reflective particles, chips or platelets between the webs or batts.

Still another object of the present invention is to provide an improved process and product for making a heat reflective fabric structure capable of use in the manufacture of blankets, wearing apparel, drapes, upholstery material or the like, the resulting fabric structure having a better warmth factor, hand, drape and/or napping characteristic than heat reflective fabric structures heretofore known.

These and other objects and advantages of the present invention will appear more fully in the following specification, claims and drawings in which:

FIGURE 1 is a side elevational view diagrammatically illustrating the novel process for producing the improved non-woven fabric structure according to the present invention;

FIGURE 2 is a fragmentary perspective view of the fabric structure made according to the present invention, the fabric structure being pulled apart at a corner in order to disclose the appearance of the layer of chips of aluminum foil interposed between layers of fibers; and FIGURE 3 is an enlarged sectional view through a piece of non-woven fabric structure of the present invention, the view being taken substantially on the line 3—3 of FIGURE 2.

Referring now to the drawings wherein like character reference numerals represent like or similar parts and, in particular, to FIGURE 1, the process of the present invention is schematically shown and broadly contemplates sandwiching a sheet of metallic foil 10 such as aluminum or the like having heat reflective characteristics, between two or more webs or batts 12 and 14 of loosely matted fibers and then passing the webs and the interposed sheet of metallic foil 10 through a needle loom generally designated at 16. The needle loom 16 may be of the type disclosed in my U.S. Patent No. 3,132,406 issued May 12, 1964, and the needling process may be similar to the needling process disclosed in my U.S. Patents 3,090,099 and 3,090,100 both issued May 21, 1963. The needle loom 16 reorients the loosely matted fibers of the webs 12 and 14 into interlooping and interlacing cohering entanglement with one another and simultaneously pierces the sheet 10 until the metallic foil is broken up into small chips, particles or platlets 18 (FIGURES 2 and 3). A more detailed description of this novel process and the fabric structure produced will follow later in the specification.

It will be understood the webs or batts 12 and 14 may be continuously fed from conventional carding machines (not shown) where the fibers are carded and loosely formed into webs, or the webs may be supplied from rolls of such material after the material has been taken from such carding machine and formed into rolls. Preferably, the webs or batts 12 and 14 have a majority of their loosely matter fibers cross-layed with respect to the direction of feed of the webs through the needle loom 16. The carding of the webs 12 and 14 results in the fibers being generally oriented parallel with respect to the longitudinal axis of the web and then the web may be shingle folded so that when it is fed as a web through the needle loom, the fibers extend generally crosswise of the direction of feed.

The needle loom 16 as disclosed in the aforementioned patents includes opposed sets or banks of needles arranged to alternately penetrate the opposite surfaces of the webs 12 and 14 as they are advanced in step-by-step increments with the sheet of metallic foil 10 therebetween. Such a needle loom 16 provides for positive inter fiber entanglement of the loosely matted fibers of the webs 12 and 14 through the sheet of metallic foil 10 as the sheet is broken into little chips 18. However, even though the needles of the needle loom 16 penetrate the sheet of metallic foil 10 and break the same up into small chips 18, the chips 18 remain substantially in the same plane between the layers 20 and 22 formed by the webs 12 and 14, the fibers of one web being carried through the area where the sheet 10 is positioned so that they can be entangled with the fibers of the other web and vice versa. While the entanglement of fibers is substantially identical to that disclosed in my aforementioned Patents 3,090,099 and 3,090,100 and as also described in my U.S. Patent 3,112,552 issued Dec. 3, 1963, the resulting fabric structure being discharged from the needle loom 16 differs materially in that it is provided with the chips 18 of metallic foil distributed in a plane between the layers formed from the webs 12 and 14.

The sheet of metallic foil 10 is substantially as wide as the width of the webs 12 and 14 when the sheet is fed into the needle loom 16 along with the webs. Because of this, the chips or flakes 18 formed through action of the needles penetrating the webs 12 and 14 will substantially cover the area between the layers 20 and 22 of the fabric structure after needling. It will now be appreciated that the action of the needles passing through the sheet of metallic foil 10 causes the sheet to break up into little chips or flakes, the chips being slightly wrinkled so that even though the chips substantially cover the area between the layers 20 and 22, they do not affect the porosity of the needled fabric structure. However, the metallic foil of the chips retains its heat reflective factor as there is no resin or adhesive coating the same to cut down on the chips reflective characteristics. Consequently, when the needled fabric structure is used, for example, as a blanket or wearing apparel, the heat radiated from the body of the person passes through the layer of the fabric structure until it hits the chips of metallic foil and then it is radiated back off of the same and is not lost by passing completely through the fabric structure. This is accomplished without sacrificing the porosity of the fabric structure or the strength as the breaking of the sheet of metallic foil does not interfere with the needling action on the fibers from one web to the other.

As shown in FIGURE 1, the sheet of metallic foil is fed from a roll 24 onto a foundation 26 fed from a beam 28. The foundation may be filaments or long fibers or fibers spun into yarns or threads of a scrim extending in a warped-wise direction or a foundation having only filaments, threads or yarn extending in a warped-wise direction. The foundation merely provides a carrier for the webs 12 and 14 and, it is of course, within the scope of the present invention that the sheet of metallic foil 10 may by itself serve as the carrier or foundation.

After the webs 12 and 14 with the sheet 10 interposed therebetween have been needled into the fabric structure F by the needle loom 16, the fabric structure F may be subsequently treated by stretching as disclosed in my U.S. Patent 3,154,462. Also, it will be understood, depending upon what the fabric structure F is to be subsequently used, it can be subjected to additional textile treating processes such as dyeing and/or napping.

The metallic foil or sheet 10 is preferably an aluminum foil although other lightweight metallic foils may be used. It has been found that aluminum foil having a thickness range of .00025 inch to .0025 inch can be used in the process and result in a lightweight fabric structure having no appreciable difference with respect to hand and drape from a fabric structure made without chips of metallic foil embedded therein. The most preferable range of thickness of metallic foil is .00025 inch to .001 inch as the thicker foils serve no additional function or advantage.

What is claimed is:
1. A process for making a non-woven fabric structure comprising the steps of: forming webs of loosely matted fibers; interposing a sheet of metallic foil between the webs of loosely matted fibers to form a sandwich structure; and then simultaneously entangling the fibers of one web with each other and with the fibers of the other web and breaking the sheet of metallic foil into small chips by needling the sandwich structure.

2. The process of claim 1 wherein the metallic foil is an aluminum foil.

3. The process of claim 1 in which the needling is accomplished from both sides of the sandwich structure.

4. A process for making a non-woven fabric structure comprising the steps of: forming webs of loosely matted fibers; interposing a sheet of metallic foil and a foundation comprising threads extending in a warped-wise direction between the webs of loosely matted fibers to form a sandwich structure; and then simultaneously entangling the fibers of one web with each other and with the fibers of the other web and breaking the sheet of metallic foil into small chips remaining in a position substantially intermediate the surfaces of the nonwoven fabric structure by needling the sandwich structure.

5. The process of claim 4 wherein the metallic foil is aluminum foil.

6. The process of claim 4 wherein the metallic foil is an aluminum foil and wherein the simultaneous entanglement of the fibers and the breaking of the sheet is accomplished by needling the sandwich structure from both sides of the same.

7. The method of claim 6 wherein the sheet of aluminum foil has a thickness in the range of .00025 inch to .0025 inch.

8. The method of claim 6 wherein the sheet of aluminum foil has a thickness in the range of .00025 inch to .001 inch.

9. A non-woven fabric structure having a plurality of layers of fibers, the fibers of each of said layers being oriented into cohering fiber entanglement with each other and with fibers in the other layers, and chips of metallic foil distributed in at least one plane between layers and substantially covering the plane, all of said chips of metallic foil being substantially spaced from the surfaces of the fabric structure.

10. The non-woven fabric structure as claimed in claim 9 in which the metallic foil is aluminum having a range of thickness between .00025 inch and .0025 inch.

11. The non-woven fabric structure of claim 9 in which a foundation comprising threads extending in a warped-wise direction is interposed between the layers along with the metallic foil.

References Cited

UNITED STATES PATENTS

| | | | |
|---|---|---|---|
| 3,034,940 | 5/1962 | Collins et al. | 161—89 |
| 3,097,124 | 7/1963 | Denenberg. | |
| 3,113,001 | 12/1963 | Weber | 28—72.2 X |
| 3,148,105 | 9/1964 | Johnson | 161—80 X |
| 3,191,257 | 6/1965 | Smith | 161—154 X |

ROBERT F. BURNETT, *Primary Examiner.*

R. L. MAY, *Assistant Examiner.*

U.S. Cl. X.R.

28—72.2; 161—80, 158, 162, 142, 154